(12) United States Patent
Delean

(10) Patent No.: US 7,821,541 B2
(45) Date of Patent: Oct. 26, 2010

(54) REMOTE CONTROL APPARATUS USING GESTURE RECOGNITION

(76) Inventor: Bruno Delean, Avenida Merixell No. 20 Roc. escolls 2-6E, Andorra La Vella (AD) AD 500

(*) Notice: Subject to any disclaimer, the term of this patent is extended or adjusted under 35 U.S.C. 154(b) by 706 days.

(21) Appl. No.: 11/821,215

(22) Filed: Jun. 22, 2007

(65) Prior Publication Data
US 2007/0252898 A1 Nov. 1, 2007

Related U.S. Application Data

(63) Continuation-in-part of application No. 10/116,839, filed on Apr. 5, 2002, now Pat. No. 7,369,685.

(51) Int. Cl.
*H04N 5/232* (2006.01)
*G06K 9/46* (2006.01)

(52) U.S. Cl. .................... 348/211.1; 382/203

(58) Field of Classification Search ............ 348/211.99, 348/211.1; 382/115, 118, 181, 203, 288
See application file for complete search history.

(56) References Cited

U.S. PATENT DOCUMENTS

| | | | |
|---|---|---|---|
| 5,594,469 A | 1/1997 | Freeman et al. | |
| 6,002,808 A | 12/1999 | Freeman | |
| 6,115,482 A * | 9/2000 | Sears et al. | 382/114 |
| 6,351,222 B1 * | 2/2002 | Swan et al. | 340/825.72 |
| 7,058,204 B2 | 6/2006 | Hildreth et al. | |
| 7,606,411 B2 * | 10/2009 | Venetsky et al. | 382/153 |
| 2006/0187196 A1 * | 8/2006 | Underkoffler et al. | 345/156 |

OTHER PUBLICATIONS

Freeman, William T. and Weissman, Craig D., Television Control by Hand Gestures, Mitsubishi Electric Research Laboratories, http://www.merl.com/reports/docs/TR94-24.pdf, Jun. 1995.

(Continued)

*Primary Examiner*—Kelly L Jerabek
(74) *Attorney, Agent, or Firm*—Soquel Group LLC

(57) ABSTRACT

A video processor for recognizing gestures, including a video camera for capturing photographs of a region within the camera's field of view, in real-time, an image processor coupled with the video camera for detecting a plurality of hand gestures from the photographs captured by the video camera, and a controller coupled with the image processor, wherein the controller can be in a dormant mode or an active mode, and wherein the controller transitions from dormant mode to active mode when the image processor detects a progression of two states within the captured photographs, the two states being (i) a closed fist and (ii) an open hand, and wherein the controller performs a programmed responsive action to an electronic device based on the hand gestures detected by the image processor when the controller is in active mode. A method and a computer-readable storage medium are also described and claimed.

26 Claims, 3 Drawing Sheets

OTHER PUBLICATIONS

Keskin, C., Erkan, A. and Akarun, L., Real Time Hand Tracking and 3D Gesture Recognition for Interactive Interfaces using HMM, http://www.cs.nyu.edu/~naz/docs/icann.pdf.

Kohler, Markus, Vision Based Hand Gesture Recognition Systems, http://ls7-www.cs.uni-dortmund.de/research/gesture/vbgr-table.html, Jun. 2007.

Starner, Thad, Weaver, Joshua and Pentland, Alex, Real-Time American Sign Language Recognition,http://web.media.mit.edu/~testarne/asl/asl-tr466/main-tr466.html, Apr. 1996.

Cohen, Charles, The Gesture Recognition Home Page, http://www.cybernet.com/~ccohen/gesture.html, Jun. 2007.

* cited by examiner

REMOTE CONTROL APPARATUS USING GESTURE RECOGNITION

CROSS REFERENCES TO RELATED APPLICATIONS

This application is a continuation-in-part of application U.S. Ser. No. 10/116,839, filed on Apr. 5, 2002 now U.S. Pat. No. 7,369,685, entitled "Vision-Based Operating Method and System."

FIELD OF THE INVENTION

The present invention relates to vision-based systems and automated gesture recognition.

BACKGROUND OF THE INVENTION

Automated gesture recognition was the subject of considerable study from 1995-2001. An early objective of gesture recognition was to recognize sign languages, such as American Sign Language for the deaf. Gestures were processed based on a three-dimensional geometry of the human hand.

Another objective of gesture recognition was control of machines, as described in U.S. Pat. No. 5,594,469 to Freeman et al entitled HAND GESTURE MACHINE CONTROL SYSTEM. The approach used by Freeman et al. was to have a hand gesture cause movement of an on-screen displayed hand icon over an on-screen displayed machine control icon. The hand icon moves the machine control icon in accordance with sensed hand movements, to effectuate machine control. An advantage of this approach is that a user does not have to learn a set of gestures, but instead has to make a series of motion and adjust the motions using the hand icon.

In U.S. Pat. No. 6,002,808 to Freeman entitled HAND GESTURE CONTROL SYSTEM, and in Mitsubishi's published report TR-94 entitled TELEVISION CONTROL BY HAND GESTURES, hand gestures are sensed optically through use of a camera, and converted into a digital representation based on horizontal and vertical position of the hand, length and width of the hand, and orientation of the hand.

In U.S. Pat. No. 7,058,204 to Hildreth et al. entitled MULTIPLE CAMERA CONTROL SYSTEM, a multi-camera technology is described, whereby a person can control a screen by pointing a finger.

SUMMARY OF THE DESCRIPTION

The ability for a person to interact with devices without the need for special external equipment is attractive. The present invention concerns a human-computer interactive system and method, which captures visual input and processes it into commands, such as turn on/turn off, volume up/volume down and other such commands, which are issued to computer-controlled devices. The system and method of the present invention complement conventional interfaces based on keyboard, mouse, remote control or speech.

The present invention enables a person to control electronic devices, such as a television, DVD player, stereo system, game console, lighting fixture and automobile stereo systems by making simple hand gestures.

The present invention works in normal conditions, and also in adverse conditions such as low lighting or cluttered background. The gestures used by the present invention are substantially unambiguous; i.e., they stand out from other gestures that a person normally makes with his hand or arm.

There is thus provided in accordance with an embodiment of the present invention a video processor for recognizing gestures, including a video camera for capturing photographs of a region within the camera's field of view, in real-time, an image processor coupled with the video camera for detecting a plurality of hand gestures from the photographs captured by the video camera, and a controller coupled with the image processor, wherein the controller can be in a dormant mode or an active mode, and wherein the controller transitions from dormant mode to active mode when the image processor detects a progression of two states within the captured photographs, the two states being (i) a closed fist and (ii) an open hand, and wherein the controller performs a programmed responsive action to an electronic device based on the hand gestures detected by the image processor when the controller is in active mode.

There is moreover provided in accordance with an embodiment of the present invention a method for recognizing gestures, including capturing photographs of a region in real-time, detecting a plurality of hand gestures, detecting a progression of two states within the captured photographs, in real-time, the two states being (i) a closed fist and (ii) an open hand, and performing a programmed responsive action based on subsequent hand gestures detected after the detecting the progression of the two states.

There is further provided in accordance with an embodiment of the present invention a computer-readable storage medium storing program code for causing a computing device to capture photographs of a region in real-time, to detect a plurality of hand gestures, to detect a progression of two states within the captured photographs, in real-time, the two states being (i) a closed fist and (ii) an open hand, and to perform a programmed responsive action based on subsequent hand gestures detected after the detecting the progression of the two states.

BRIEF DESCRIPTION OF THE DRAWINGS

The present invention will be more fully understood and appreciated from the following detailed description, taken in conjunction with the drawings in which.

DETAILED DESCRIPTION

The present invention relates to vision-based automated gesture recognition for controlling electronic devices. The generic use case is a person who very conveniently controls devices in the same room by hand gestures, without having to get up from his sofa or to get out of his chair, or upon entering a room. The person is monitored by a video camera that continuously captures images of his movements. The captured images are processed by a computer, and are monitored for specific hand gestures. Detection of the hand gestures in turn triggers a command processor for one or more devices.

Figure 1:
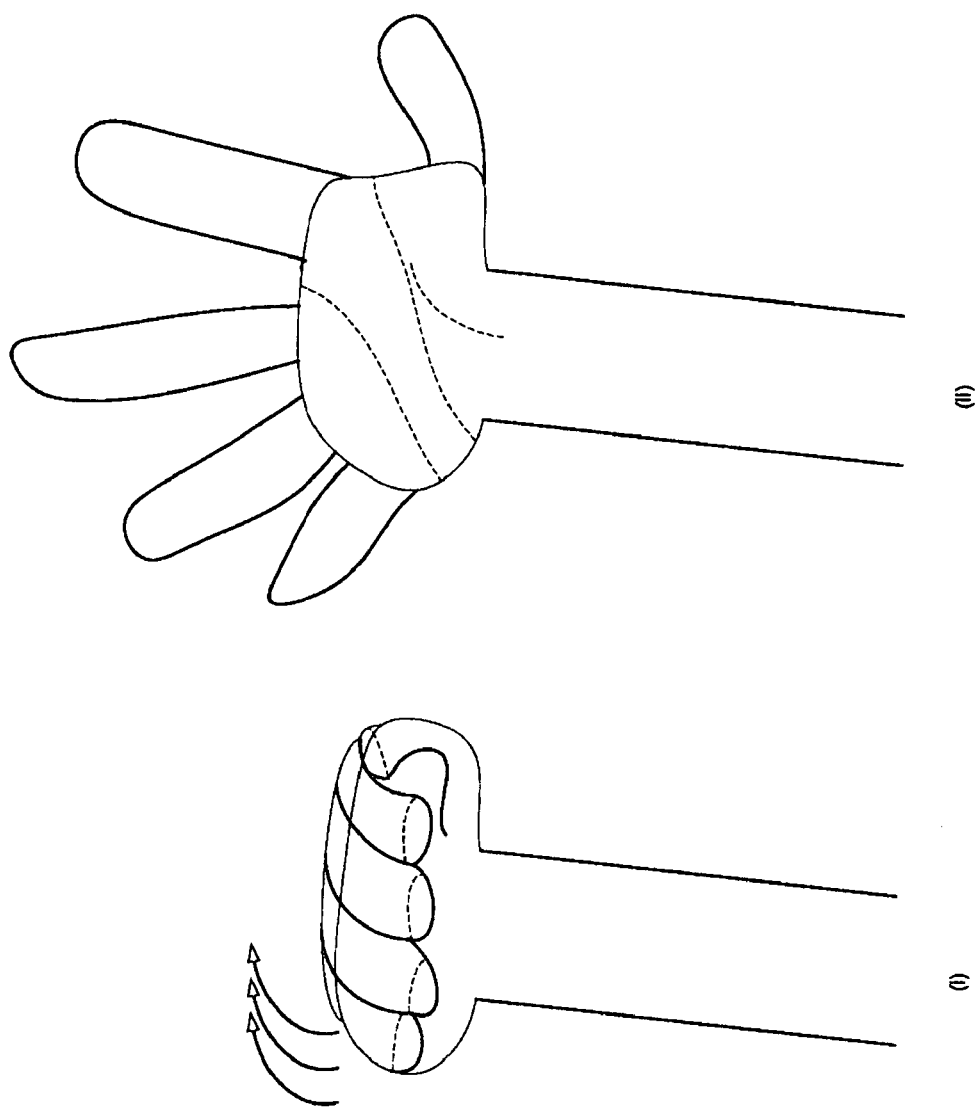
FIG. 1 is a sketch of two progressive states of a hand gesture, in accordance with an embodiment of the present invention.

Reference is now made to FIG. 1, which is a sketch of two progressive states of a hand gesture, in accordance with an embodiment of the present invention. The first state, labeled (i), corresponds to a closed fist in a substantially stable position. The second state, labeled (ii), corresponds to an open hand with the fingers outstretched.

The progression of these two states is readily and unambiguously discernible from a series of captured images, even under conditions of background clutter and low lighting.

Detection of the two states in FIG. 11 triggers a command processor. In one embodiment of the present invention, the command processor is operative to activate at least one of a plurality of control commands, in accordance with subsequent hand movements. I.e., detection of the two states of FIG. 1 places the processor in a ready mode, whereby subsequent hand gestures are used to invoke control commands. After the control commands are invoked, the processor returns to a dormant mode, until it the next time at which the two states in FIG. 1 are detected.

TABLE I hereinbelow provides example hand gestures and the corresponding commands that they invoke.

TABLE I

Hand Gestures and their Interface Control Commands

| Subsequent hand movements | Command that is invoked |
| --- | --- |
| Hand vertically up | Volume up |
| Hand vertically down | Volume down |
| Hand up + hand push forward | Turn on |
| Hand up + hand pull back | Turn off |
| Hand to the right | Increment channel |
| Hand to the left | Decrement channel |
| Hand up + hand to the right | Play |
| Hand up + hand to the left | Pause |
| Hand up + hand to the right + hand to the right | Fast forward |
| Hand up + hand to the left + hand to the left | Reverse play |
| Closed fist | End |

Regarding the volume up and volume down commands, in an embodiment of the present invention if the person moves his hand upwards or downwards then the volume is increased or decreased respectively by a preset amount. If the person pauses and then continues to move his hand upwards or downwards then the volume is increased or decreased slowly, as if a volume bar is being dragged slowly.

Regarding the channel increment and decrement commands, in an embodiment o the present invention moving the hand to the right or to the left increments or decrements a channel, respectively. If the person pauses and then continues to move his hand to the right or to the left, then the channels increase or decrease respectively one after the next.

It will be appreciated by those skilled in the art that other hand movement vs. command relationships are within the scope of the present invention. For example, vertical movements of the hand may control the channels and horizontal movements of the hand may control the volume.

As listed in TABLE I, in order to increase the number of commands that may be invoked via hand gestures, multiple hand gestures can be interpreted as a single command. The last entry in TABLE I is an "end" command, and serves to cancel the alert mode of the command processor without invoking a specific command.

Figure 2:
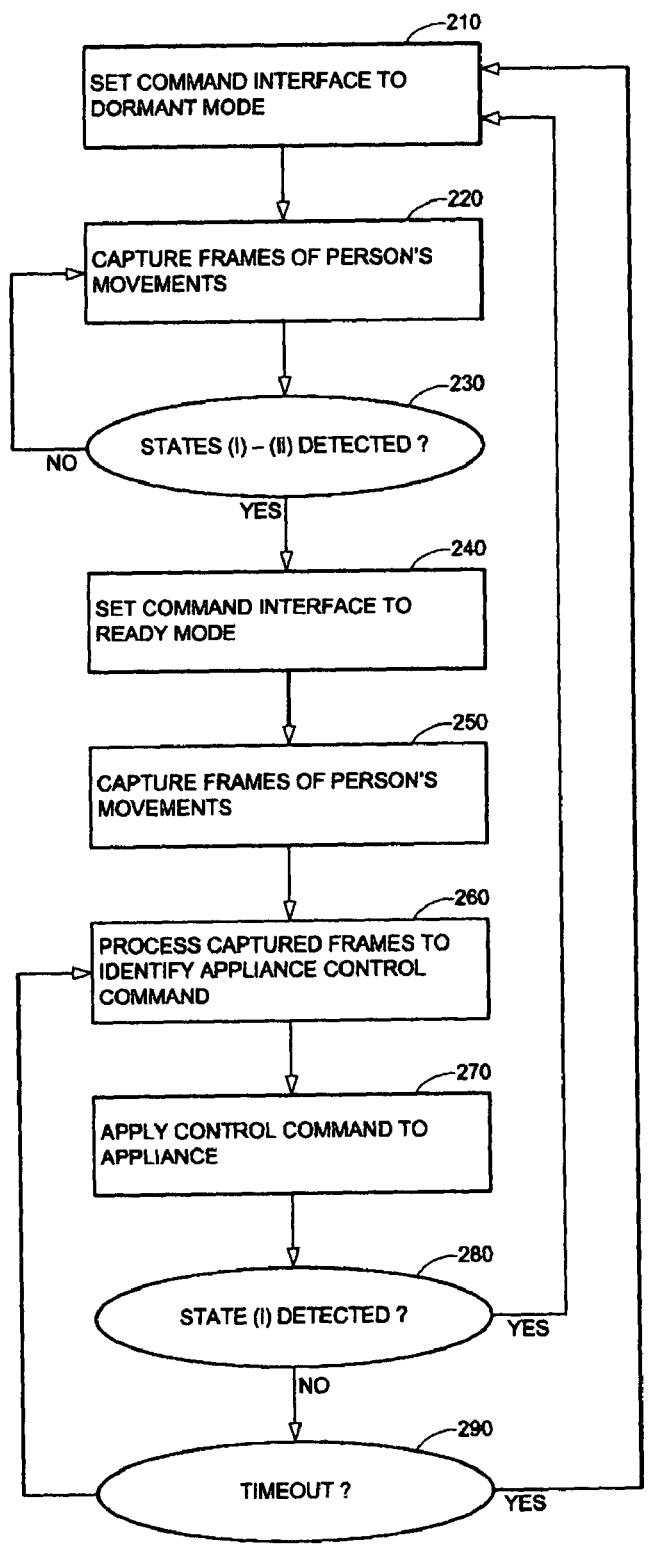
FIG. 2 is a simplified flowchart of a method for controlling an electronic device using automated gesture recognition, in accordance with an embodiment of the present invention.

Reference is now made to FIG. 2, which is a simplified flowchart of a method for controlling an electronic device using automated gesture recognition, in accordance with an embodiment of the present invention. At step 210 a command interface for the electronic device is set to dormant mode. At step 220, a camera continuously captures frames of a person's movements. When the command interface is in dormant mode, control commands are not sent to the device in response to the person's movements.

At step 230, the captured frames are analyzed for detection of the two states illustrated in FIG. 1. If the two states are not detected, then the command interface remains in dormant mode, and the camera continues to captures image frames of the person's movements at step 220. However, if the two states are detected at step 230, then at step 240 the command interface is set to ready mode. When the command interface is in ready mode, successive gestures made by the person are used to invoke control commands to the device.

At step 250 the camera continues to capture frames of the person's movements, and at step 260 the captured frames are processed to identify control commands. For example, the frames may be processed to detect one of the gestures indicated in TABLE I, and the appropriate control command is the one that corresponds to the detected gesture in TABLE I. At step 270 the identified control command is applied to the electronic device.

At step 280, the captured frames are analyzed for detection of state (i) of FIG. 1; namely, a closed fist. If state (i) is detected, the command processor is then reset to dormant mode at step 210, and processing continues as above. At step 290, a determination is made whether a timeout period has elapsed since the most recent control command was detected at step 260. If not, the command processor waits for the next control command at step 260. Otherwise, the command processor is reset to dormant mode at step 210, and processing continues as above.

Figure 3:
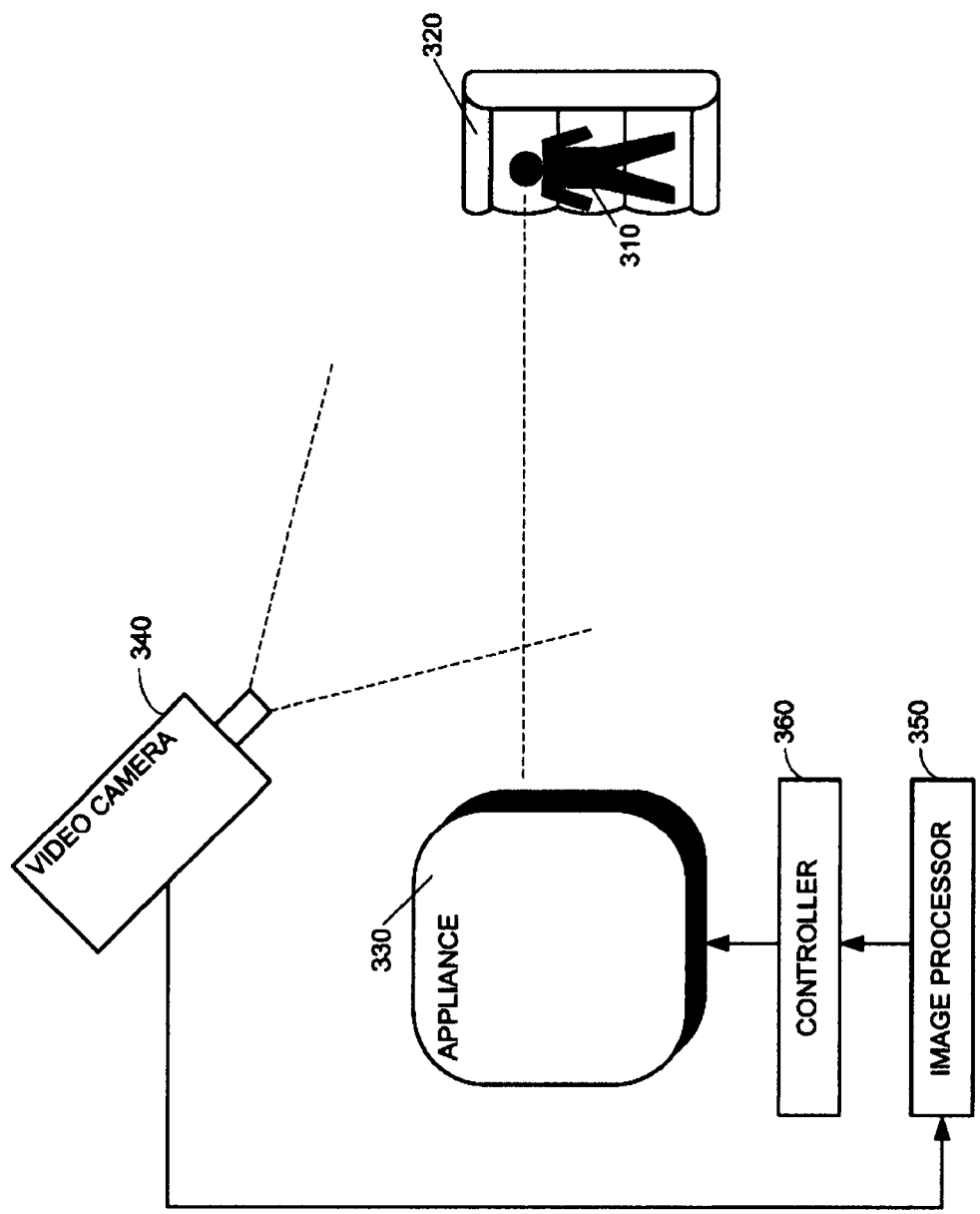
FIG. 3 is a simplified block diagram of a system for controlling an electronic device using automated gesture recognition, in accordance with an embodiment of the present invention.

Reference is now made to FIG. 3, which is a simplified block diagram of a system for controlling an electronic device using automated gesture recognition, in accordance with an embodiment of the present invention. Shown in FIG. 3 is a person 310 reclining on a sofa 320 interacting with an electronic device 330, such as a television, a play station, or such other interactive entertainment system. A video camera 340 in the room continuously captures image frames of person 310's movements.

An image processor 350 processes the frames captured by video camera 340, in order to detect the occurrence of gestures made by person 310 corresponding to the two states illustrated in FIG. 1L. A controller 360 for device 330 invokes control commands based on signals received from image processor 350, according to the flowchart of FIG. 2.

Implementation Details

Provided below is software source code for recognizing on open hand with three consecutive fingers adjacent to one another, in accordance with an embodiment of the present invention.

```
1   #include "DetectionMains.h"
2
3   CDetectionMains::CDetectionMains(PIXEL * image, int * luminance, int
4   height, int width)
5   {
```

-continued

```
 6    int    nb = width * height, i;
 7    this->luminance = luminance;
 8    this->image = image;
 9    this->height = height;
10    this->width = width;
11    tableau = new char[nb];
12    for (i = 0; i < nb; i++)
13       tableau[i] = 0;
14    tableDoigts = new int[nb];
15 }
16
17 CDetectionMains::~CDetectionMains( )
18 {
19    delete tableDoigts, delete tableau;
20 }
21
22 int CDetectionMains::CalculMains(int epaisseurMini, int epaisseurMaxi, int
23  * listX, int * listY)
24 {
25    int    nb = height * width, i, j, x, y, x0, y0, x1, y1, x2, y2,
26       point, accu = 0, E0, E1, E2, E, EE, n, t;
27    char   *ct;
28    PIXEL *pix, P, G;
29    P.r = 255, P.g = P.b = 0;
30    G.r = 0, G.g = 255, G.b = 0;
31    Emin = epaisseurMini, Emax = epaisseurMaxi;
32    for (i = 0; i < nb; i++)
33       tableau[i] = 0, tableDoigts[i] = 0;
34    CalculOngles( );
35    ct = tableau;
36
37 /* Look at map of the fingernails and check the separation, i.e. determine
38    if they are connected to fingers */
39    for (y = 0; y < height; y++)
40       for (x = 0; x < width; x++)
41       {
42          if (*ct)
43          {
44             if (Isolement(x, y))
45             {
46                t = tableDoigts[y * width + x] = CalculDoigt (x, y);
47                if (t)
48                {
49                   pix = image + y * width + x;
50                   for (i = -2; i <= 2; i++)
51                      pix[i] = P, pix[i * width] = P;
52                }
53             }
54          }
55          ++ct;
56       }
57
58 /* For each digit looking for neighbors to see if there are 3 fingers with
59    similar thickness with realistic position */
60    for (y = 0; y < height; y++)
61       for (x = 0; x < width; x++)
62       {
63          if (E = tableDoigts[y * width + x])
64          {
65             E0 = (3 * E) / 4, E1 = (5 * E) / 4 + 2, E2 = 2 * E, EE = 3 * E;
66             x0 = x, x1 = x + 4 * E + 3, y0 = y - EE - 2, y1 = y + 2 * EE + 2;
67             if ((x0 <= 0) || (y0 <= 0) || (x1 >= width) || (y1 >= height))
68                continue;
69             x0 = x, y0 = y;
70             x1 = x0 + EE;
71             point = 0, i = x0 + 1;
72             while ((!point) && (i < x1))
73             {
74                for (j = y0 - E2; j <= y0 + E2; j++)
75                   if (t = tableDoigts[j * width + i])
76                      point = t, x1 = i, y1 = j;
77                ++i;
78             }
79             if ((! point) || (point < E0) || (point > E1))
80                continue;
81             x2 = x1 + EE;
82             point = 0, i = x1 + 1;
83             while ((! point) & (i < x2))
84             {
```

```
85              for (j = y1 - E2; j <= y1 + E2; j++)
86                if (t = tableDoigts[j * width + i])
87                  point = t, x2 = i, y2 = j;
88              ++i;
89            }
90            if ((!point) || (point < E0) || (point > E1))
91              continue;
92            if (((x2 - x0) * (y1 - y0)) >= ((y2 - y0) * (x1 - x0)))
93              continue;
94            tableDoigts[n = (y0 * width + x0)] = 0;
95            image[n] = P;
96            tableDoigts[n = (y1 * width + x1)] = 0;
97            image[n] = P;
98            tableDoigts[n = (y2 * width + x2)] = 0;
99            image[n] = P;
100           if (accu < 100)
101           {
102             listX[accu] = x;
103             listY[accu] = y;
104           }
105           ++accu;
106         }
107       }
108     return accu;
109 }
110
111 /* Compute all the fingers of the image; each finger has properties of
112 thickness and position in the image */
113 int CDetectionMains::CalculDoigt (int x, int y)
114 {
115    int   E, i, j, E0, E1, h, d, val, milieu, longueur, deviation, accu, compt;
116    val = luminance[y * width + x];
117    Segment (x, y, val, E, milieu);
118    if ((E < Emin) || (E > Emax))
119      return 0;
120    E0 = (2 * E) / 3, E1 = (3 * E) / 2;
121    deviation = E / 2 + 1;
122    x = milieu;
123    milieu = x;
124    j = y;
125    do
126    {
127      --j, i = milieu;
128      Segment (i, j, val, longueur, milieu);
129      d = i - x;
130      if (d < 0)
131        d = -d;
132    }
133    while ((longueur < E1) && (longueur > 1));
134    h = y - j;
135    if ((longueur >= E1) || (h > E))
136      return 0;
137    milieu = x;
138    j = y;
139    accu = 0;
140    compt = 0;
141    do
142    {
143      ++j, i = milieu;
144      Segment (i, j, val, longueur, milieu);
145      d = i - x;
146      if (d < 0)
147        d = -d;
148      h = j - y;
149      accu += longueur;
150      ++compt;
151    }
152    while ((longueur > E0) && (longueur < E1) && (d <= deviation) && (h <= E));
153    if (h <= E)
154      return 0;
155    return (accu / compt);
156 }
157
158 void CDetectionMains::CalculOngles( )
159 {
160    int   x, y, j, x0, y0, x1, y1, d, E, n,
161      *pt, *qt;
162    char *ct;
163    x0 = y0 = 9;
```

```
164      x1 = width – x0;
165      y1 = height – y0;
166      for (y = y0; y < y1; y++)
167      {
168         pt = luminance + (n = y * width);
169         ct = tableau + n;
170         x = x0;
171         while ((x < x1) && (pt[x] == pt[x – 1]))
172            ++x;
173         while (x < x1)
174         {
175            E = 1, ++x;
176            while ((x < x1) && (pt[x] == pt[x – 1]))
177               ++x, ++E;
178            if ((E >= Emin) && (E <= Emax))
179            {
180               n = E / 2, j = y – 1, d = 1;
181               qt = luminance + x – n;
182               while((j > 0) && (d <= E) && (qt[(j – 1) * width] == qt[j * width]))
183                  --j, ++d;
184               if ((d < E) && (d > n))
185                  ct[x – n] = 1;
186            }
187         }
188      }
189   }
190
191   bool CDetectionMains::Isolement(int x, int y)
192   {
193      char *pt;
194      pt = tableau + (y – 1) * width + x;
195      if (*pt || pt[–1] || pt[1] || pt[–2] || pt[2])
196         return 0;
197      pt –= width;
198      if (*pt || pt[–1] || pt[1] || pt[–2] || pt[2])
199         return 0;
200      pt –= width;
201      if (*pt || pt[–1] || pt[1] || pt[–2] || pt[2])
202         return 0;
203      return 1;
204   }
205
206   void CDetectionMains::Segment(int x, int y, int val, int &longueur, int
207   &milieu)
208   {
209      int    *pt, i, e, x0, x1;
210      if ((y < 0) || (y >= height))
211      {
212         longueur = 0;
213         return;
214      }
215      pt = luminance + y * width;
216      i = x;
217      while ((i > 0) && (pt[i] == val))
218         --i;
219      x0 = i + 1;
220      e = x – 1;
221      i = x + 1;
222      while ((i < width) && (pt[i] == val))
223         ++i;
224      x1 = i – 1;
225      milieu = (x0 + x1) / 2;
226      e += (i – x – 1);
227      longueur = e;
228   }
```

The algorithm implemented by the source code includes inter alia the following features:

The algorithm process a gradient image.

The algorithm characterizes a finger as a fingernail ("ongle", lines 158-189) and a stick ("segment", lines 206-228).

The algorithm recognizes fingers in a vertical position. A finger must be a reasonable size, 5-10 pixels wide in a normalized image. This is referred to as "epaisseur max/min".

After detecting a finger, the algorithm attempts to find three consecutive fingers.

The fingers must fit inside an inverted U.

Table_doigt is an array of fingers, wherein each finger has a thickness and a position.

In a second phase, the algorithm checks for convexity (lines 92-93), to ensure that the upper outline of the fingernails is not concave.

In reading the above description, persons skilled in the art will realize that there are many apparent variations that can be applied to the methods and systems described. Thus it may be appreciated that the present invention applies to multi-player games, including inter alia card games, chess, racing cars, and sports competitions.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A video processor for recognizing gestures, comprising:
a video camera for capturing photographs of a region within the camera's field of view, in real-time;
an image processor coupled with said video camera for detecting a plurality of hand gestures from the photographs captured by said video camera; and
a controller coupled with said image processor, wherein said controller can be in a dormant mode or an active mode, and wherein said controller transitions from dormant mode to active mode when said image processor detects a progression of two states within the captured photographs, the two states being (i) a closed fist and (ii) an open hand, wherein said controller issues a command to an electronic device based on the hand gestures detected by said image processor only when said controller is in active mode, and wherein said controller transitions back to the dormant mode after issuing a command.

2. The video processor of claim 1 wherein said image processor also detects if the two states (i)-(ii) occur within pre-specified time intervals, one after the next.

3. The video processor of claim 1 wherein said image processor detects the progression of the two states (i)-(ii) based on edge filters of the captured photographs.

4. The video processor of claim 1 wherein said image processor detects the progression of the two states (i)-(ii) based on motion detection.

5. The video processor of claim 1 wherein the plurality of hand gestures includes moving a hand to the right or to the left.

6. The video processor of claim 1 wherein the plurality of hand gestures includes moving a hand up or down.

7. The video processor of claim 1 wherein the plurality of hand gestures includes moving a hand forward or backward.

8. The video processor of claim 1 wherein the command is one of a turn on/turn off command to the electronic device.

9. The video processor of claim 1 wherein the command is one of a volume up/volume down command to the electronic device.

10. The video processor of claim 1 wherein the command is one of a next channel/previous channel command to the electronic device.

11. The video processor of claim 1 wherein the action command is one of a play/pause command to the electronic device.

12. The video processor of claim 1 wherein the command is one of a fast forward/reverse play command to the electronic device.

13. The video processor of claim 1 wherein said controller transitions from active mode to dormant mode when said image processor detects a closed fist.

14. A method for recognizing gestures, comprising:
capturing photographs of a region in real-time;
detecting a plurality of hand gestures;
detecting a progression of two states within the captured photographs, in real-time, the two states being (i) a closed fist and (ii) an open hand;
transitioning from a dormant mode to an active mode after said detecting the progression of the two states;
issuing a command to an electronic device based on hand gestures detected while in the active mode; and
transitioning to the dormant mode after issuing a command.

15. The method of claim 14 wherein said detecting a progression also detects if the two states (i)-(ii) occur within pre-specified time intervals, one after the next.

16. The method of claim 14 wherein said detecting a progression detects the progression of the two states (i)-(ii) based on edge filters of the captured photographs.

17. The method of claim 14 wherein said detecting a progression detects the progression of the two states (i)-(ii) based on motion detection.

18. The method of claim 14 wherein the plurality of hand gestures includes moving a hand to the right or to the left.

19. The method of claim 14 wherein the plurality of hand gestures includes moving a hand up or down.

20. The method of claim 14 wherein the plurality of hand gestures includes moving a hand forward or backward.

21. The method of claim 14 wherein the command is one of a turn on/turn off command.

22. The method of claim 14 wherein the command is one of a volume up/volume down command.

23. The method of claim 14 wherein the command is one of a next channel/previous channel command.

24. The method of claim 14 wherein the command is one of a play/pause command.

25. The method of claim 14 wherein the command is one of a fast forward/reverse play command.

26. A computer readable storage medium storing program code for causing a computing device:
to capture photographs of a region in real-time;
to detect a plurality of hand gestures;
to detect a progression of two states within the captured photographs, in real-time, the two states being (i) a closed fist and (ii) an open hand;
to transition from a dormant mode to an active mode after said detecting the progression of the two states;
to issue a command to an electronic device-based on hand gestures detected while in the active mode; and
to transition to the dormant mode after issuing a command.

* * * * *